United States Patent
Spencer

(10) Patent No.: US 10,711,391 B2
(45) Date of Patent: Jul. 14, 2020

(54) CLOTHES STEAMER FOR AN AIRCRAFT CABIN

(71) Applicant: Gulfstream Aerospace Corporation, Savannah, GA (US)

(72) Inventor: Stephen Spencer, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 162 days.

(21) Appl. No.: 16/057,118

(22) Filed: Aug. 7, 2018

(65) Prior Publication Data
US 2020/0048823 A1    Feb. 13, 2020

(51) Int. Cl.
*D06F 73/00* (2006.01)
*B64D 11/00* (2006.01)

(52) U.S. Cl.
CPC ............. *D06F 73/00* (2013.01); *B64D 11/00* (2013.01)

(58) Field of Classification Search
CPC ...... D06F 73/00; D06F 3/02; D06F 50/00–08; D06F 60/00; D06F 67/005; D06F 69/00; B64D 11/00; B64D 11/003; B64D 11/02; B64D 2013/0629; B64D 47/00
See application file for complete search history.

(56) References Cited

U.S. PATENT DOCUMENTS

| | | | | |
|---|---|---|---|---|
| 2,719,213 A | * | 9/1955 | Johnson | F24D 13/022 338/212 |
| 3,872,693 A | * | 3/1975 | Cashen | D06B 9/00 68/6 |
| 4,817,582 A | * | 4/1989 | Oslin | A21B 1/24 126/20 |
| 5,528,912 A | * | 6/1996 | Weber | D06F 58/14 223/51 |
| 6,007,025 A | * | 12/1999 | Coughren | B64D 11/02 105/329.1 |
| 9,399,833 B1 | * | 7/2016 | Thornton | D06F 71/026 |
| 2005/0115120 A1 | | 6/2005 | Cevik | |
| 2014/0224454 A1 | * | 8/2014 | Schootstra | B64D 11/04 165/104.19 |
| 2017/0107659 A1 | * | 4/2017 | Hills | B64D 11/00 |
| 2017/0160011 A1 | * | 6/2017 | Hyde | D06F 58/206 |

FOREIGN PATENT DOCUMENTS

| | | | |
|---|---|---|---|
| WO | WO 2008068221 A1 | * | 6/2008 |
| WO | 20170184769 A1 | | 10/2017 |

* cited by examiner

*Primary Examiner* — Ismael Izaguirre
(74) *Attorney, Agent, or Firm* — LKGlobal | Lorenz & Kopf, LLP

(57) ABSTRACT

A clothes steamer for an aircraft cabin, having a closable case fixed to an internal surface of the aircraft cabin. A steam generator is fluidly coupled to the clothes holding cavity configured to selectively increase the humidity of air within the clothes holding cavity. A temperature and humidity sensors are configured to produce a first signal indicative of a temperature within the clothes holding cavity. A cold finger configured to remove water from the air within the clothes holding cavity. A controller is provided which is configured to receive temperature and the humidity sensor signals and to selectively produce at least one of a steam generator control signal and a cold finger control signal to selectively operate the steam generator and the cold finger.

20 Claims, 2 Drawing Sheets

CLOTHES STEAMER FOR AN AIRCRAFT CABIN

FIELD OF THE INVENTION

The present invention relates to a clothes steam cleaning device, more particularly to a clothes steam cleaner for an aircraft cabin.

BACKGROUND OF THE INVENTION

Today's business schedules often require long air travels between locations, followed immediately by business meetings. Due to the confinement caused by seatbelts and cramped spaces within an aircraft's cabin, wrinkles are often formed in the clothing of aircraft passengers. These wrinkles are undesirable for airline passengers attempting to make an elevated professional impression.

Traditionally, wrinkles in clothing can be removed from clothing using a steam iron and an ironing board. Unfortunately, it is impractical to use a steam iron on a plane as it represents a fire hazard. Further, due to changes in air pressure and temperatures within the aircraft cabin caused by changes in elevation in the aircraft, steam formed by the iron can act as a source of water which may adversely condense on windows and windshields of the aircraft.

SUMMARY OF THE INVENTION

As specified in the background of the invention section above, there is a need for improved devices and methods for removing wrinkles and refreshing clothing for an air traveler. According to the present teachings, various non-limiting embodiments of a clothes steamer system for an aircraft cabin is provided.

In a first non-limiting embodiment, the clothes steamer includes, but is not limited to, a case having a closable door, that the case and closable door define a clothes holding cavity. The clothes steamer further includes, but is not limited to, a steam generator fluidly coupled to the clothes holding cavity. The steam generator is configured to produce steam to increase the water content of the air within the clothes holding cavity. The clothes steamer further includes but is not limited to. a humidity sensor configured to provide a humidity signal indicative of the humidity within the clothes holding cavity. The clothes steamer further includes but is not limited to a temperature sensor configured to produce a temperature signal indicative of the temperature within the clothes holding cavity. The clothes steamer further includes, but is not limited to, a pressure sensor configured to provide a pressure signal indicative of an atmospheric pressure within the aircraft cabin. The clothes steamer further includes, but is not limited to, a controller that is electrically coupled to the steam generator, the humidity sensor, the temperature sensor, and the pressure sensor. The controller is configured to produce a steamer control signal. The steam generator is configured to receive the steamer control signal and change the amount of water in air within the clothes holding cavity.

According to the present teachings, another non-limiting embodiment of a clothes steamer for an aircraft cabin is provided. The clothes steamer includes, but is not limited to, a case fixed to an internal surface of the aircraft cabin. The case has a closable door. The case and the closable door together define a clothes holding cavity. The clothes steamer further includes, but is not limited to, a steam generator fluidly coupled to the clothes holding cavity. The steam generator is configured to selectively increase the humidity of air within the clothes holding cavity. The clothes steamer further includes, but is not limited to, a first temperature sensor configured to produce a first signal indicative of a temperature within the clothes holding cavity. The clothes steamer further includes, but is not limited to, a first humidity sensor configured to produce a first signal indicative of a humidity within the clothes holding cavity. The clothes steamer further includes, but is not limited to, a cold finger configured to remove water from the air within the clothes holding cavity. The clothes steamer further includes, but is not limited to, a controller that is configured to receive the first signal indicative of a temperature and the first signal indicative of humidity to selectively produce at least one of a steam generator control signal and a cold finger control signal to selectively operate the steam generator and the cold finger.

According to an alternate another non-limiting embodiment of a clothes steamer for an aircraft cabin is provided. The clothes steamer includes, but is not limited to, a case having a closable door. The case and the closable door together define a clothes holding cavity. The clothes steamer further includes, but is not limited to, a steam generator fluidly coupled to the clothes holding cavity and is configured to selectively increase the humidity of air within the clothes holding cavity. The clothes steamer further includes, but is not limited to, a first temperature sensor configured to produce a first signal indicative of a temperature within the clothes holding cavity. The clothes steamer further includes, but is not limited to, a first humidity sensor configured to produce a first signal indicative of a humidity within the clothes holding cavity. The clothes steamer further includes, but is not limited to, a pressure sensor configured to produce a signal indicative of air pressure within the aircraft cabin. The clothes steamer further includes, but is not limited to, a controller configured to receive at least one of the first signal indicative of a temperature, the first signal indicative of humidity, and a signal indicative of air pressure within the aircraft cabin, and to produce a steam generator control signal to operate the steam generator.

DETAILED DESCRIPTION OF THE FIGURES

In the following, reference is made to embodiments of the disclosure. However, the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be an element or limitation of the appended claims except where explicitly recited in a claim (s).

Figure 1:
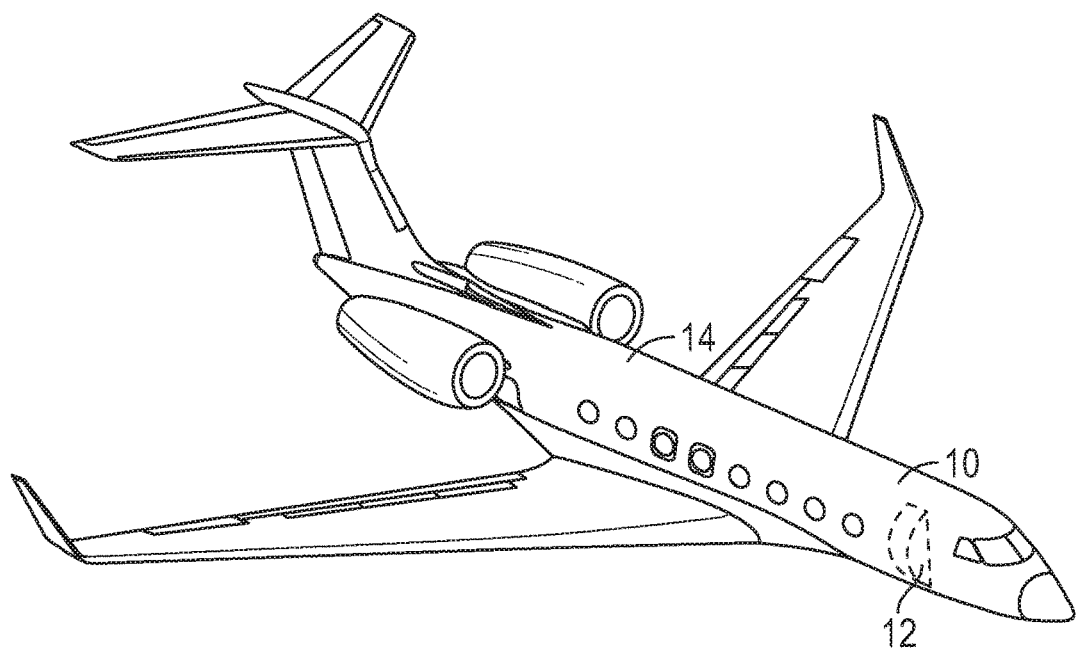
FIG. 1 represents a perspective view of an aircraft having a non-limiting embodiment of a clothes steamer for an aircraft cabin according to the present teachings.

FIG. 1 represents an aircraft 10 having a clothes steamer 12 for an aircraft cabin 14 according to the present teachings. The clothes steamer 12 can be fixed to an internal surface of the aircraft cabin 14 such as a wall or bulkhead. The aircraft cabin 14 has a dew point based on the temperature, humidity, and pressure of the air within the cabin. As described below, a controller 26 is configured to control the humidity within the steam cleaner 12 and selectively disengage a steam generator 20 when release of humid air from the clothes holding cavity into the aircraft cabin 14 will bring the air within the aircraft cabin 14 above the dew point.

Figure 2:
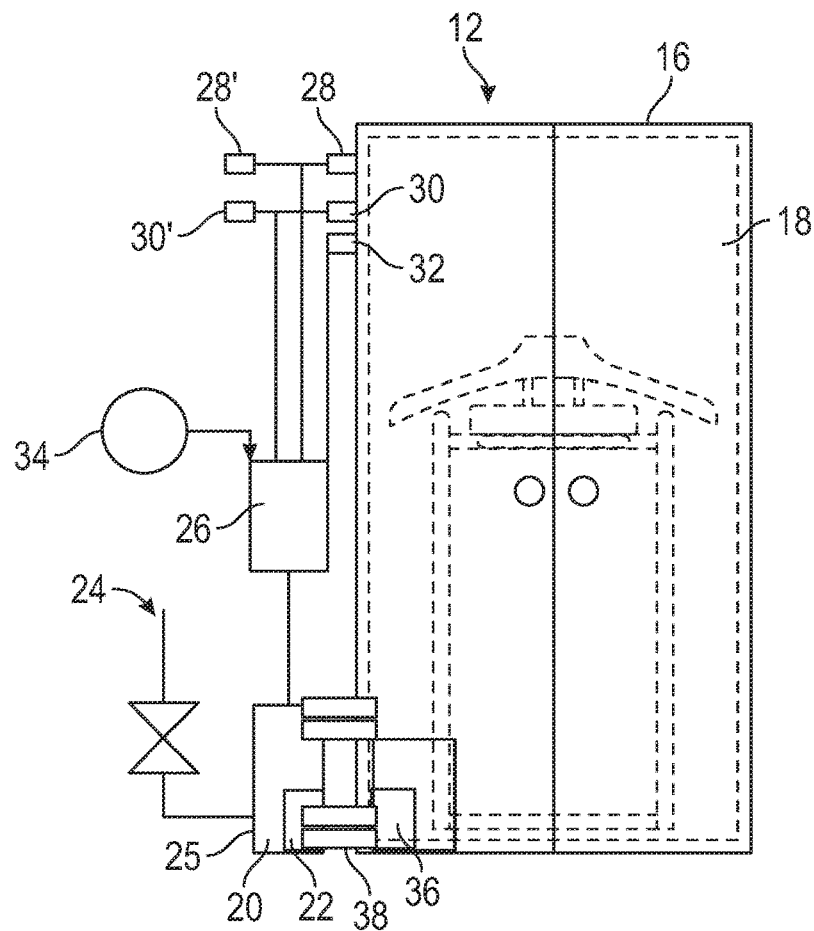
FIG. 2 represents a front view of the non-limiting embodiment of the clothes steamer for an aircraft according to the present invention.
Figure 4:
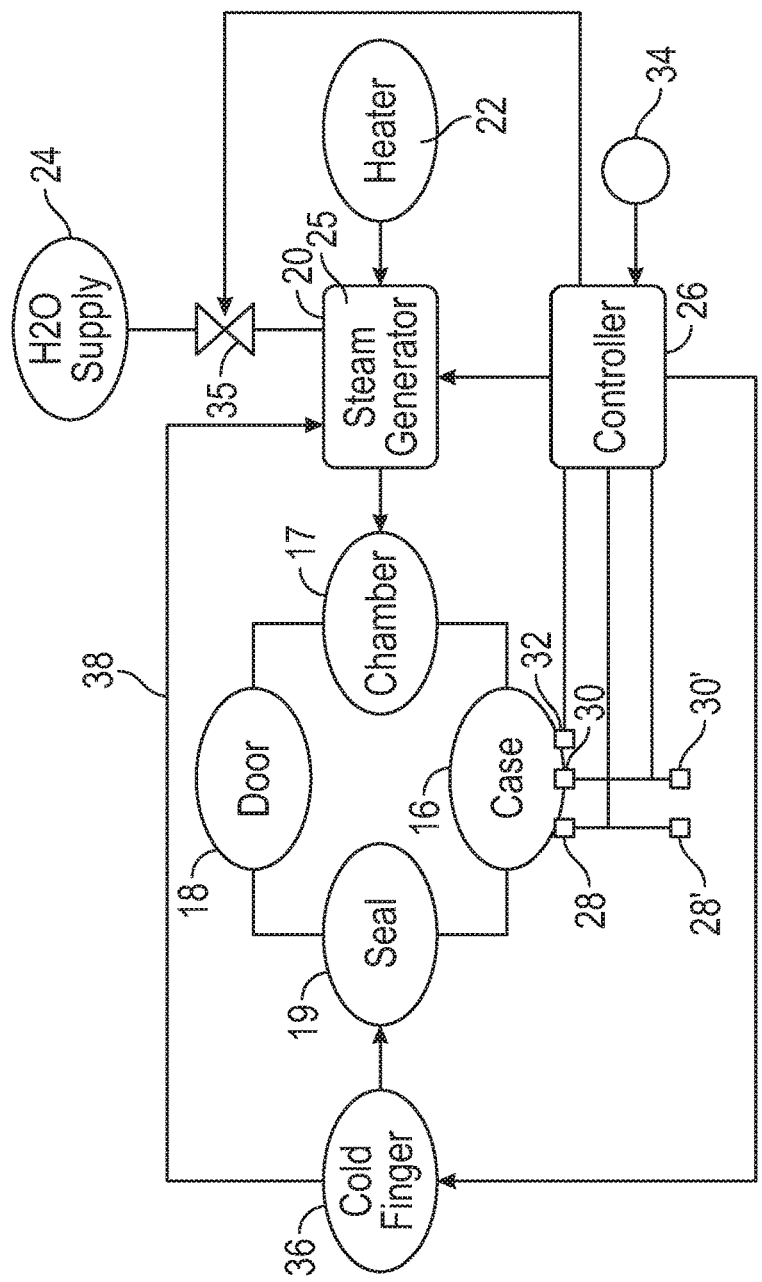
FIG. 4 represents a system's view of the clothes steamer shown in FIGS. 1-3.
Figure 3:
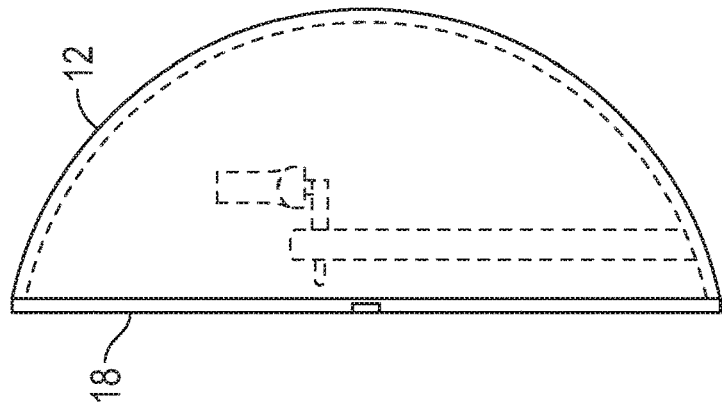
FIG. 3 represents a side view of the clothes steamer of FIG. 2.

FIGS. 2 and 3 represent a front and side view, respectively, of the clothes steamer 12 for the aircraft 10 according to the present invention. The clothes steamer 12 includes a case 16 and a closable door 18 and a fluid seal 19 therebetween, that defines a clothes holding cavity or chamber 17. The clothes steamer 12 includes a steam generator 20 fluidly coupled to the clothes holding cavity 17. The steam generator 20 has a heater 22 configured to produce steam to increase the water content of the air within the clothes holding cavity 17 and thus remove wrinkles in the clothing. A humidity sensor 28 configured to provide a humidity signal indicative of the humidity and a temperature sensor 30 configured to produce a temperature signal indicative of the temperature are both operably coupled to the clothes holding cavity 17 are provided. The clothes steamer 12 includes a pressure sensor 32 configured to provide a pressure signal indicative of an atmospheric pressure within the aircraft cabin 14.

A controller 26 is provided that is electrically coupled to the steam generator 20, the humidity sensor 28, the temperature sensor 30, and the pressure sensor 32. This controller 26 is configured to produce a steamer generator control signal and is further configured to transmit the steamer generator control signal to steam generator 20. The steam generator 20 is configured to receive the steamer control signal and change the amount of water in air within the clothes holding cavity 17 in response to the steam generator control signal.

The controller 26 is configured to receive the signal indicative of humidity, the signal indicative of temperature, the signal indicative of pressure and produce the steamer controller signal based on the values of these signals. The clothes steamer 12 can have a second temperature sensor 28' configured to provide a second temperature signal indicative of a temperature of air within the aircraft cabin 14. A second humidity sensor 30' is configured to provide a second humidity signal indicative of a humidity of air within the aircraft cabin 14.

The controller 26 is configured to receive the second humidity signal and the second temperature signal, is further configured to produce the steamer controller signal in response to changes in the second temperature and second humidity sensors. Differences in the signals from the sensors inside and outside of the cavity are used by the controller 26 to determine how long the steam generator should be engaged. The steam generator 20 is fluidly coupled to a water supply 24 and an electric power supply 25. The controller 26 can further have a timer 34 which can affect the actuation of the different components in the system. The controller 26 can provide a steam control signal in responses to changes in an output signal from the timer 34.

Optionally, the clothes steamer 12 can further have a dehumidifier component or cold finger 36 and a water collection cavity to remove water from the air within the cavity 17. A cold finger 36 has an exterior surface configured to induce the condensation of gasses, such as water, found in the atmosphere around the cold finger 36. The Cold finger 36 is intentionally cooled to a temperature lower than the atmospheric temperature around the cold finger 36 to bring the dew point of the atmosphere around the cold finger below a temperature needed to induce condensation. It is envisioned that the cold finer can be cooled using a Peltier device. This water collection cavity is fluidly coupled to the steam generator 20 to reuse the water in a next steam cycle. A fluid coupling 38 can be provided which allows for the recycling of fluid from the cold finger 36 and the steam generator 20. The controller 12 is configured to receive the second humidity signal and the second temperature signal. The controller is configured to revise the steamer controller signal in response to changes in the second temperature and second humidity sensors.

With continuing reference to FIGS. 1-3, FIG. 4 represents a system schematic of the clothes steamer 12 show in FIGS. 1-3. The clothes steamer 12 for an aircraft cabin 14, has a closable case 16 having a seal 19 and door 18 fixed to an internal surface of the aircraft cabin 14. A steam generator 20 having a heater 22 is fluidly coupled to the clothes holding cavity 17 configured to selectively increase the humidity of air within the clothes holding cavity 17. A temperature and humidity sensors 28, 28', 30, 30' are configured to produce a first signal indicative of a humidity and temperature within (and outside) of the clothes holding cavity 17.

A pressure sensor 32 is configured to produce a signal indicative of pressure within the aircraft cabin 14. A cold finger 36 is configured to remove water from the air within the clothes holding cavity 17. As is shown, optionally, fluid from the cold finger is passed to the steam generator for recycling. A controller 26 is provided which is configured to receive temperature, humidity, and pressure sensor signals and to selectively produce at least one of a steam generator control signal and a cold finger control signal to selectively operate the steam generator 20 and the cold finger 36.

The controller described above can be used in a circuit board which can be a specific circuit, or a microprocessor utilizing a computer program. These computer programs (also known as programs, software, software applications, scripts, or program code) include machine instructions, for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program can be written in any form of programming language, including compiled or interpreted languages, and it can be deployed in any form, including as a stand-alone program, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include an aircraft hosted local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. For instance, the steam generator would typically be used before the cold finger was used to remove humidity within the cavity.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Upon reading this disclosure, those of skill in the art will appreciate still additional alternative structural and functional designs for a system and a process for deep search in computing environments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A clothes steamer for an aircraft cabin, the clothes steamer comprising:
    a case having a closable door, the case and closable door defining a clothes holding cavity;
    a steam generator fluidly coupled to the clothes holding cavity, the steam generator configured to produce steam and to direct the steam into the clothes holding cavity;
    a humidity sensor configured to provide a humidity signal indicative of the humidity within the clothes holding cavity;
    a temperature sensor configured to produce a temperature signal indicative of the temperature within the clothes holding cavity;
    a pressure sensor configured to provide a pressure signal indicative of an atmospheric pressure within the aircraft cabin;
    a controller electrically coupled to the steam generator, the humidity sensor, the temperature sensor, and the pressure sensor, the controller configured to produce a steamer control signal,
    wherein said steam generator is configured to receive the steamer control signal and to produce an amount of steam based on the steamer control signal.

2. The clothes steamer according to claim 1, wherein the controller is configured to receive the signal indicative of humidity, the signal indicative of temperature, the signal indicative of pressure and produce the steamer controller signal based on the values of these signals.

3. The clothes steamer according to claim 1, further comprising a second temperature sensor configured to provide a second temperature signal indicative of a temperature of air within the aircraft cabin.

4. The clothes steamer according to claim 3, further comprising a second humidity sensor configured to provide a second humidity signal indicative of a humidity of air within the aircraft cabin.

5. The clothes steamer according to claim 4, wherein the controller is configured to receive the second humidity signal and the second temperature signal, the controller configured to produce the steamer controller signal in response to changes in the second temperature and second humidity sensors.

6. The clothes steamer according to claim 1, wherein the steam generator is fluidly coupled to a water supply and an electric power supply.

7. The clothes steamer according to claim 1, wherein the controller further comprises a timer, the controller providing the steam control signal in responses to changes in an output signal from the timer.

8. The clothes steamer according to claim 1, wherein the controller selectively engages the steam generator before engaging the cold finger.

9. The clothes steamer according to claim 1, further comprising a cold finger having a water collection cavity fluidly coupled to the steam generator.

10. A clothes steamer for an aircraft cabin, said clothes steamer comprising:
   a case fixed to an internal surface of the aircraft cabin, the case having a closable door, the case and the closable door together defining a clothes holding cavity;
   a steam generator fluidly coupled to the clothes holding cavity configured to selectively direct steam into the clothes holding cavity;
   a first temperature sensor configured to produce a first signal indicative of a temperature within the clothes holding cavity;
   a first humidity sensor configured to produce a first signal indicative of a humidity within the clothes holding cavity;
   a cold finger configured to remove water from the air within the clothes holding cavity; and
   a controller configured to receive the first signal indicative of a temperature and the first signal indicative of humidity to selectively produce at least one of a steam generator control signal and a cold finger control signal to selectively operate the steam generator and the cold finger.

11. The clothes steamer according to claim 10, further comprising a second temperature sensor configured to produce a second signal indicative of a temperature within the aircraft cabin; and further comprising a second humidity sensor configured to produce a second signal indicative of a humidity within the aircraft cabin; and
   further comprising a pressure sensor configured to provide a pressure signal indicative of air pressure within the cabin.

12. The clothes steamer according to claim 11, wherein said controller is configured to selectively disengage the steam generator when release of humid air from the clothes holding cavity into the aircraft cabin will bring the air within the aircraft cabin above a dew point within the cabin.

13. The clothes steamer according to claim 10, further comprising a seal disposed between the closable door and the case.

14. The clothes steamer according to claim 10, further comprising a water supply and an electrical supply coupled to the steam generator.

15. The clothes steamer according to claim 10, further comprising fluid coupling between the cold finger and the steam generator.

16. A clothes steamer for an aircraft cabin, said clothes steamer comprising:
   a case having a closable door, the case and the closable door together define a clothes holding cavity;
   a steam generator fluidly coupled to the clothes holding cavity configured to selectively generate steam and direct the steam into the clothes holding cavity;
   a first temperature sensor configured to produce a first signal indicative of a temperature within the clothes holding cavity;
   a first humidity sensor configured to produce a first signal indicative of a humidity within the clothes holding cavity;
   a pressure sensor configured to produce a signal indicative of air pressure within the aircraft cabin; and
   a controller configured to receive at least one of the first signal indicative of a temperature, the first signal indicative of humidity, and a signal indicative of air pressure within the aircraft cabin, and selectively produce a steam generator control signal to selectively operate the steam generator.

17. The clothes steamer according to claim 16, further comprising a cold finger disposed within the clothes holding cavity, wherein the controller is configured to receive the first signal indicative of a temperature and the first signal indicative of humidity selectively produce at least one of a steam generator control signal and a cold finger control signal to selectively operate the steam generator and the cold finger.

18. The clothes steamer according to claim 17, further comprising a second temperature sensor configured to provide a second temperature signal indicative of a temperature of air within the aircraft cabin.

19. The clothes steamer according to claim 18, further comprising a second humidity sensor configured to provide a second humidity signal indicative of a humidity of air within the aircraft cabin.

20. The clothes steamer according to claim 19, wherein the controller is configured to receive the second humidity signal and the second temperature signal, the controller configured to produce the steamer controller signal in response to changes in the second temperature and second humidity sensors.

* * * * *